US012222825B2

(12) United States Patent
Parekh et al.

(10) Patent No.: US 12,222,825 B2
(45) Date of Patent: Feb. 11, 2025

(54) SYSTEMS AND METHODS FOR DISASTER RECOVERY FOR EDGE DEVICES

(71) Applicant: Microsoft Technology Licensing, LLC, Redmond, WA (US)

(72) Inventors: Prem Mukesh Parekh, Karnataka (IN); Sanmoy Ray, Karnataka (IN); Aritra Basu, Karnataka (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/807,153

(22) Filed: Jun. 16, 2022

(65) Prior Publication Data

US 2023/0385164 A1 Nov. 30, 2023

(30) Foreign Application Priority Data

May 31, 2022 (IN) .............................. 202241031171

(51) Int. Cl.
*G06F 11/16* (2006.01)
*G06F 11/07* (2006.01)
*G06F 11/14* (2006.01)
*G06F 11/20* (2006.01)
*G06F 11/30* (2006.01)

(52) U.S. Cl.
CPC ...... *G06F 11/1658* (2013.01); *G06F 11/0709* (2013.01); *G06F 11/0772* (2013.01); *G06F 11/0793* (2013.01); *G06F 11/1425* (2013.01); *G06F 11/1469* (2013.01); *G06F 11/2028* (2013.01); *G06F 11/203* (2013.01); *G06F 11/3051* (2013.01)

(58) Field of Classification Search
CPC ............. G06F 11/1658; G06F 11/0709; G06F 11/0772; G06F 11/0793; G06F 11/1425; G06F 11/1469; G06F 11/2028; G06F 11/203; G06F 11/3051
See application file for complete search history.

(56) References Cited

U.S. PATENT DOCUMENTS

| | | | |
|---|---|---|---|
| 9,262,257 B2 * | 2/2016 | Allu ...................... | G06F 11/079 |
| 9,846,621 B1 | 12/2017 | Mirkhelkar et al. | |
| 2009/0222690 A1 | 9/2009 | Seelig et al. | |
| 2016/0266990 A1 * | 9/2016 | Akirav ................... | G06F 16/27 |

(Continued)

OTHER PUBLICATIONS

"International Search Report and Written Opinion Issued in PCT Application No. PCT/US23/018428", Mailed Date: Jul. 3, 2023, 14 Pages.

*Primary Examiner* — Bryce P Bonzo
*Assistant Examiner* — Michael Xu

(57) ABSTRACT

Examples of the present disclosure describe improved systems and methods for disaster recovery for edge devices. In one example implementation, a current device configuration for a first device is received. The current device configuration comprises a device state and a workload configuration of the first device. A bootstrapping package for the first device is generated based on the current device configuration for the first device. Generating the bootstrapping package comprises segmenting the device state and the workload configuration into a namespace. The bootstrapping package is provided to a second device. The bootstrapping package is configured to be automatically installed on the second device.

20 Claims, 6 Drawing Sheets

(56) References Cited

U.S. PATENT DOCUMENTS

| | | | |
|---|---|---|---|
| 2017/0300394 A1* | 10/2017 | Raut | G06F 11/203 |
| 2019/0289467 A1* | 9/2019 | Sasin | H04W 4/70 |
| 2020/0364117 A1 | 11/2020 | Enakiev et al. | |
| 2021/0224093 A1* | 7/2021 | Fu | G06F 9/5072 |
| 2021/0349767 A1* | 11/2021 | Asayag | G06F 9/4856 |
| 2022/0156164 A1* | 5/2022 | Gunjikar | G06F 3/067 |
| 2022/0171648 A1* | 6/2022 | Rodriguez | G06F 9/5072 |
| 2022/0327007 A1* | 10/2022 | Adogla | C07K 16/2818 |
| 2022/0413974 A1* | 12/2022 | Wang | G06F 11/2038 |

* cited by examiner

SYSTEMS AND METHODS FOR DISASTER RECOVERY FOR EDGE DEVICES

CROSS-REFERENCE TO RELATED APPLICATIONS

This application claims the benefit of Indian Application No. 202241031171 filed on May 31, 2022, which is incorporated herein by reference in its entirety.

BACKGROUND

Edge devices can be very important to a user. When edge devices are replaced, a new edge device is configured with the same configuration of the edge device to be replaced in order to ensure that the new edge device functions similarly to the edge device to be replaced. The configuration of the new edge device is often a manual process that can be cumbersome and difficult for the user, especially when the new edge device does not have same hardware or software as the device to be replaced. As a result, the manual configuration process is prone to errors and can extend the time the user is without a functioning edge device.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure describes systems and methods for disaster recovery for edge devices. In one example implementation, a current device configuration for a first device is received. The current device configuration comprises a device state and a workload configuration of the first device. A bootstrapping package for the first device is generated based on the current device configuration for the first device. Generating the bootstrapping package comprises segmenting the device state and the workload configuration into a namespace. The bootstrapping package is provided to a second device. The bootstrapping package is configured to be automatically installed on the second device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
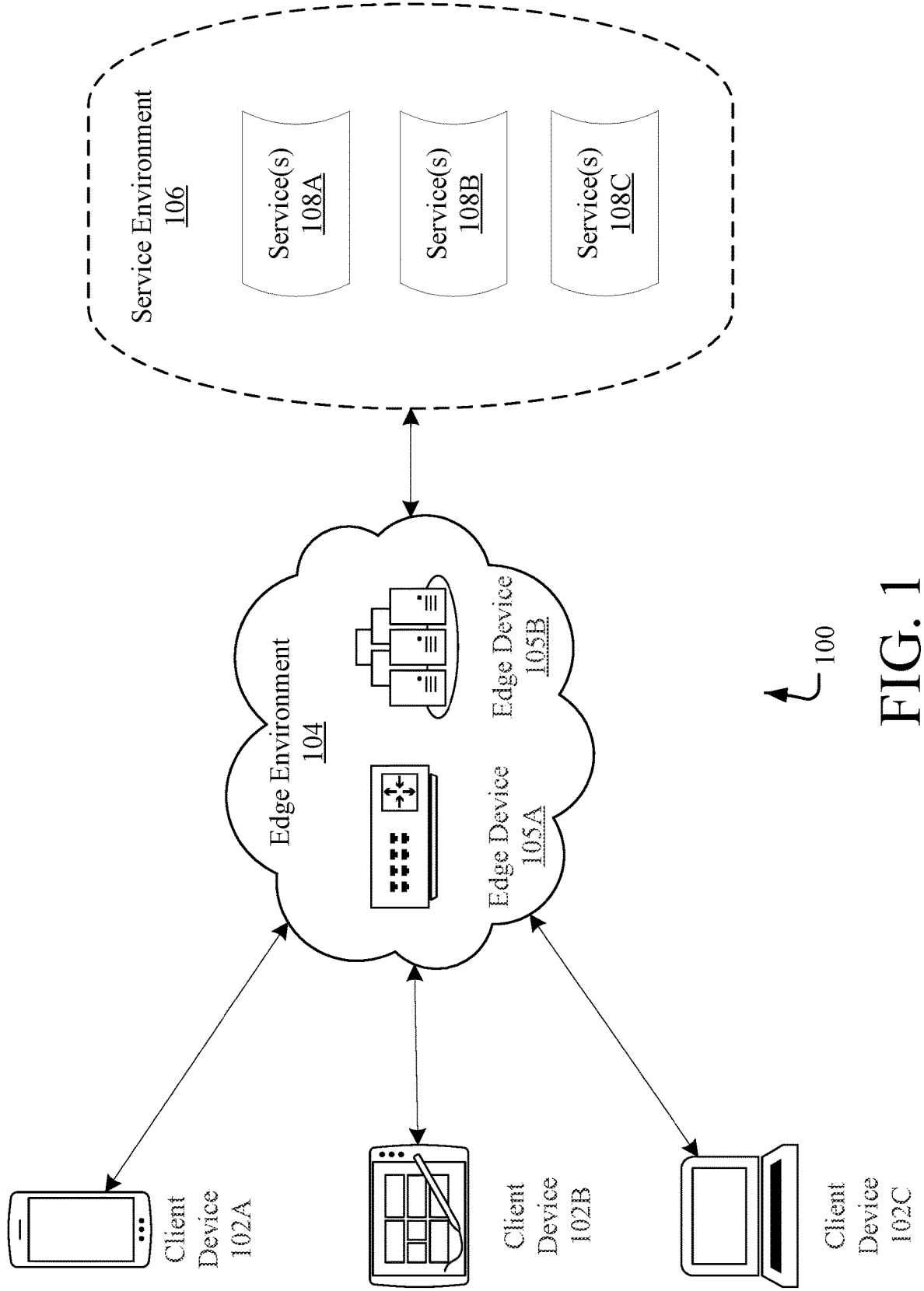
FIG. 1 illustrates an overview of an example system for disaster recovery for edge devices.

An edge device, as used herein, is a device that provides an entry point into an enterprise or service provider core network (e.g., a specialized hardware device for processing workloads, a router, a network switch, a network gateway, a network hub). Although many edge devices may have some degree of hardware resiliency, edge devices often need to be replaced in the event of irrecoverable hardware failure. To ensure that the replacement device ("second edge device") continues to function similarly to the edge device to be replaced ("first edge device"), the second edge device is typically configured with the same device configuration as the first edge device. Device configuration, as used herein, refers to desired device state (e.g., credential information, data storage information, access protocols, power state, disk state, and memory state) and workload configuration (e.g., defined workload objects, such as container objects, device connection strings, task objects).

The configuration of the second edge device can be a cumbersome manual process, especially if there are numerous workloads running on the first edge device or if the second edge device has different hardware or software from the first edge device. A workload, as used herein, refers to an application, service, capability, or a specific amount of work that can be processed. In addition to being cumbersome, manual configuration of the second device is prone to human error, as the process may be difficult and involve several steps, and is time-consuming, which extends the time the user is without a functioning edge device and exacerbates the negative impact to the user. Additionally, it is insufficient to configure the second edge device based on the original configuration of the first edge device. Rather, in order to ensure that the second edge device is configured in the same manner as the first edge device when it is replaced, incremental updates made to the configuration of the first edge device over its lifetime must be replayed onto the second edge device during its configuration.

In many scenarios, the device configuration of the first edge device is not available to a second edge device. As one example, edge devices are often implemented in disconnected or semi-connected network configurations, where network bandwidth is unavailable or limited. In such configurations, it is not always possible to transmit a large amount of information for the edge device, such as a virtual machine (VM) snapshot, between the edge device and other devices or systems. A VM snapshot, as used herein, refers to a copy of the state of a VM as it exists in server memory at a particular moment, along with any settings and the state of any virtual disks assigned to the VM. As another example, some edge devices are located within computing environments that are outside the boundary of other devices or systems, such as within an on-premises location (e.g., an on-premise or private data center) of a user. As an on-premises location is typically considered a trusted computing environment, such edge devices are often trusted to contain sensitive user data ("user secret data"), such as private user information (e.g., user account information, financial data, medical data), data security information (e.g., passwords, data encryption keys), and the like. The edge device may not be capable of or permitted to transmit configuration data for the edge device, which could include the user secret data, beyond the boundary of the on-premises location. As another example, edge devices that experience catastrophic failure are unable to provide configuration data for the edge device because the edge device is damaged, incapacitated, or shut down.

Existing solutions relating to disaster recovery for edge devices do not solve the challenges discussed above. Instead, such solutions require manual device configuration and rely heavily on VM snapshots, which, as discussed above, are not suitable for edge devices implemented in disconnected or semi-connected network configurations, in environments that do not permit edge devices to transfer configuration data, that have experiences catastrophic failure. Moreover, such solutions are focused on the recovery of the underlying data being handled by the device, as opposed to being focused on the recovery of the cumulative configuration data applied to the device.

Embodiments of the present disclosure address the challenges of the above-described solutions relating to disaster recovery for edge devices. The present systems and methods allow a user to automatically configure a second edge device as a replacement for a first edge device (e.g. without the need for manual configuration of the second edge device). In embodiments, the present systems and methods can be implemented in limited bandwidth environments, and do not require multiple edge devices to be concurrently maintained.

In implementations, a device configuration, for a first edge device is provided to a storage system, such as a cloud-based system. Multiple updated device configurations may be received at predetermined intervals or in response to an event (e.g., a configuration change of the first edge device, a detection of available network bandwidth, a manual upload of the device configuration). In implementations, data in the control plane of the first edge device (e.g., settings and device state information) is isolated from data in the data plane of the first edge device (e.g., user data) to ensure that changes in device state transition are captured while the underlying user data is not captured. The control plane, as used herein, refers to the path on which operations and computations are performed on device configuration information and workload configuration information. The data plane, as used here, refers to the path on which operations and computations are performed on user data and the software used to process the customer data.

The device configuration also includes the workload configuration of the first edge device. The workload configuration includes information relating to workloads of the first edge device, such as settings for defining workload objects (e.g., container objects, device connection strings, task objects). In some implementations, the device configuration may not include a VM snapshot or a hard disk volume mount, which may be very large in size. As such, the first edge device is able to transmit the device configuration, which is comparatively small in size, using a limited network bandwidth environment.

In implementations, a declarative model is used to describe a device configuration (e.g., desired device state and workload configuration) of the first edge device. A declarative model, as used herein, refers to a mechanism for describing the logic of an object without describing which individual statements, instructions, or function calls are executed on or evaluated for the object. The declarative model segments the device state and the workload configuration into separate objects and namespaces, and maps the segmented objects to the respective namespaces. As a specific example, a bandwidth settings object for device state is added to a first namespace and a IoT runtime object for workload configuration is added to a second namespace. A namespace, as used herein, refers to set of signs (names) that are used to refer to and group various kinds of objects. In some implementations, each configuration change or operation performed on the first edge device is mapped to a namespace in the device state description of the device configuration for the first edge device. Configuration changes can be transmitted incrementally to the storage system by providing only the namespaces for which data has changed. For instance, only the namespaces in which a device state description or a workload configuration description have changed are transmitted to the storage system.

In an implementation, the storage system generates a bootstrapping package based on the multiple device configurations, or a cumulative device configuration, for the first edge device. A bootstrapping package, as used herein, refers to a container that comprises components (e.g., code, runtime, system tools, system libraries, software dependencies) for self-compiling or self-installing software on an edge device. The bootstrapping package may be a file, such as a single package file (e.g. an executable file), that executes a disaster recovery ("DR") flow for applying ("replaying") the multiple device configurations of the first edge device to a second edge device. In examples, the bootstrapping package comprises the multiple device configurations for the first edge device, the information provided by the declarative model for the first edge device (e.g., a device state description or a workload configuration description), and/or code for compiling the device configuration of the first edge device on a separate device.

In implementations, the bootstrapping package is provided to the second edge device as part of the DR flow for the first edge device. In one example, a user retrieves the bootstrapping package from the storage system and provides the bootstrapping package to the second edge device. Alternatively, the storage system provides the bootstrapping package to the second edge device automatically in response to a detected event, such as hardware or software failure of the first edge device, the expiration of period of time, the expiration of a license, etc. In one example, the storage system automatically identifies and/or acquires a second edge device in response to the detected event. For instance, the storage system can place a purchase order for the second edge device, (re)assign a currently deployed edge device for use as the second edge device, (re)configure an edge device for use as the second edge device, or otherwise secure the second edge device. As a specific example, in response to detecting the hardware failure or the imminent hardware failure of the first edge device (based on monitoring of the first edge device), the storage system causes a new edge device to be deployed (e.g., immediately deployed) as the second edge device. The storage system then provides the bootstrapping package to the second edge device.

In implementations, when the bootstrapping package is provided to the second edge device as part of the DR flow for the first edge device (or prior to the time the bootstrapping package is provided), the storage system places the first edge device into a read-only mode. Placing the first edge device into read-only mode prevents the device state and/or workload configuration of the first edge device from being modified or uploaded to the storage system, which, in turn, prevents the storage system from creating a new bootstrapping package that conflicts with or overrides the current bootstrapping package.

In implementations, a replay engine, incorporated as a device agent of the second edge device, receives the bootstrapping package. A device agent, as used herein, refers to software that performs functionality on behalf of a user. The replay engine causes the bootstrapping package to be installed on the second edge device. As part of the installation of the bootstrapping package, the replay engine uses the information in the bootstrapping package to build a topological dependency chain of the objects associated with the device state and workload namespaces for the first edge device (e.g., namespace signs and device configuration data). The topological dependency chain represents the dependencies of the objects to each other, and indicates an evaluation order for the objects. For example, if a namespace associated with a device state of the first edge device has been segmented into two smaller sub-namespaces, the topological dependency chain will indicate that the namespace depends on the two smaller sub-namespaces (e.g., a hierarchical dependency). The replay engine evaluates the topological dependency chain (e.g., from lowest dependency to highest dependency in the hierarchical dependency) to recreate (e.g. replay) the device state and the workload configuration of the first edge device on the second edge device.

In implementations, as part of the DR flow for the first edge device, a user is provided an option to configure the second edge device with user data (e.g., secret user data) from the first edge device. In examples, the user data is stored in a storage location external to and not accessible by the storage system. The separate storage of the user data and the device configuration provide a clear demarcation between data that is private and owned by the user (e.g., the user data) and data that is the semi-private or public (e.g., the device configuration of the first edge device). If the user selects the option to configure the second edge device with user data, the second edge device retrieves the user data from the storage location and applies the user data to the second edge device.

In implementations, as part of the DR flow for the first edge device, a user is provided a preview of the second edge device configured with the device configuration of the first edge device. For example, the second edge device may provide an interface enabling a user to verify or reconfigure settings, execute a limited set of functionalities, or otherwise verify that the device configuration of the first edge device has been applied correctly to the second edge device. In examples, the storage system provides the interface enabling a user to verify the device configuration of the second edge device. For instance, the storage system may provide a virtual interface enabling the user to interact with the second edge device. In implementations, the user accepts the configuration of the second edge device (preserving the device configuration of the first edge device on the second edge device) or declines the configuration of the second edge device (removing the device configuration of the first edge device from the second edge device). In an example, the DR flow for the first edge device is idempotent such that a user may re-execute the DR flow multiple times without losing the last device configuration of the first edge device.

FIG. 1 illustrates an overview of an example system for disaster recovery for edge devices. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, the components of systems disclosed herein are distributed across multiple processing devices. For instance, input may be entered on a user device or client device and information may be processed on or accessed from other devices in a network, such as an edge device or a cloud device.

In FIG. 1, system 100 comprises client devices 102A, 102B, and 102C (collectively "client device(s) 102), edge environment 104, edge devices 105A and 105B (collectively "edge device(s) 105"), service environment 106, and service(s) 108A, 108B, and 108C (collectively "service(s) 108"). One of skill in the art will appreciate that the scale and structure of systems such as system 100 may vary and may include additional or fewer components than those described in FIG. 1. As one example, the components of edge environment 104 may be distributed across multiple edge environments or client environments. As another example, functionality and components of edge environment 104 and service environment 106 may be integrated into a single processing system or computing environment.

Client device(s) 102 may be configured to detect and/or collect input data from one or more users or user devices. In some examples, the input data corresponds to user interaction with one or more software applications or services implemented by, or accessible to, client device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data may include, for example, voice input, touch input, text-based input, gesture input, video input, and/or image input. The input data may be detected/collected using one or more sensor components of client device(s) 102. Examples of sensors include microphones, touch-based sensors, geolocation sensors, accelerometers, optical/magnetic sensors, gyroscopes, keyboards, and pointing/selection tools. Examples of client device(s) 102 include personal computers (PCs), mobile devices (e.g. smartphones, tablets, laptops, personal digital assistants (PDAs)), wearable devices (e.g. smart watches, smart eyewear, fitness trackers, smart clothing, body-mounted devices, head-mounted displays), gaming consoles or devices, and IoT devices. In examples, client device(s) 102 interact with (e.g., provide input data to and/or receive information from) edge environment 104.

Edge environment 104 may be configured to deliver various computing services and resources (e.g., applications, devices, storage, processing power, networking, analytics, intelligence) to users of a specific geographical region or area (e.g., country, state, city, neighborhood, building). Edge environment 104 may be located in geographical regions or areas that are physically (and/or logically) in close proximity to users. In one example, a first edge environment is located in close physical proximity to users in a first location and a second edge environment is located in close physical proximity to users in a second location. The first edge environment provides increased response times for data transactions for users in the first location, and the second edge environment provides increased response times for data transactions for users in the second location. Edge environment 104 provides an entry point for devices to access service environments or service provider networks, such as service environment 106. In examples, edge environment 104 comprises or provides access to edge device(s) 105.

Edge device(s) 105 may be configured to process user workloads. In examples, edge device(s) 105 implement specialized software (e.g., applications, services, machine learning (ML) models, computer code segments) associated with service environment 106. The software facilitates processing of user workloads for various users, such as users associated with client device(s) 102. In some examples, edge device(s) 105 process workloads locally on edge device(s) 105, in a remote computing environment external to edge environment 104, or in a combination thereof. In one example, edge device(s) 105 perform preprocessing operations for a workload before transmitting data associated with the workload to another computing environment for further processing. Examples of preprocessing operations include aggregating data, modifying data to remove personal user data, creating data subsets to optimize storage and bandwidth, and analyzing and reacting to IoT events. In a specific example, edge device(s) 105 interact with service environment 106 to provide incremental device configuration updates to service environment 106 and to initiate a DR flow to replace edge device(s) 105. Edge device(s) 105 may include one or more sensors, as discussed with respect to client device(s) 102. Examples of edge device(s) 105 include server devices, router devices, network switch devices, network gateway devices, and network hub devices.

Service environment 106 may be configured to provide client device(s) 102 and edge device(s) 105 access to various computing services and resources, as discussed with respect to edge environment 104. Service environment 106 may be implemented in a cloud-based or server-based environment using one or more computing devices, such as server devices or other cloud computing devices. servers, database servers, personal computers (PCs), virtual devices, and mobile devices. Service environment 104 may comprise numerous hardware and/or software components and may be subject to one or more distributed computing models/services (e.g., Infrastructure as a Service (IaaS), Platform as a Service (PaaS), Software as a Service (SaaS), Functions as a Service (FaaS)). In aspects, service environment 106 comprises or provides access to service(s) 108.

Service(s) 108 may be integrated into (e.g., hosted by or installed in) service environment 106. Alternatively, one or more of service(s) 108 may be implemented externally to service environment 106. For instance, one or more of service(s) 108 may be implemented in edge environment 104, edge device(s) 105, client device(s) 102, or a service environment separate from service environment 106. Service(s) 108 may provide access to a set of software and/or hardware functionality. A service, as used herein, refers to software that provides functionality to perform an automated or semi-automated task. Examples of service(s) 108 include data storage services, disaster recovery services, device ordering or acquisition services, audio signal processing services, word processing services, spreadsheet services, presentation services, document-reader services, social media software or platforms, search engine services, media software or platforms, multimedia player services, content design software or tools, database software or tools, provisioning services, and alert or notification services. In a specific example, service(s) 108 store device configurations received from edge device(s) 105 in a data storage location within service environment 106. Service(s) 108 use the device configurations to create bootstrapping packages for applying the device configuration of edge device(s) 105 to another device. When a disaster recovery request (or a request for a bootstrapping package) is received by service(s) 108, service(s) 108 provides the bootstrapping package to the requesting device or a different device, such as a replacement edge device(s) 105.

Having described a system that may be employed by the aspects disclosed herein, this disclosure will now describe one or more methods that may be performed by various aspects of the disclosure. In aspects, methods 200-300 may be executed by a system, such as system 100 of FIG. 1. However, methods 200-300 are not limited to such examples. In other aspects, methods 200-300 are performed by a single device or component that integrates the functionality of the components of system 100.

Figure 2:
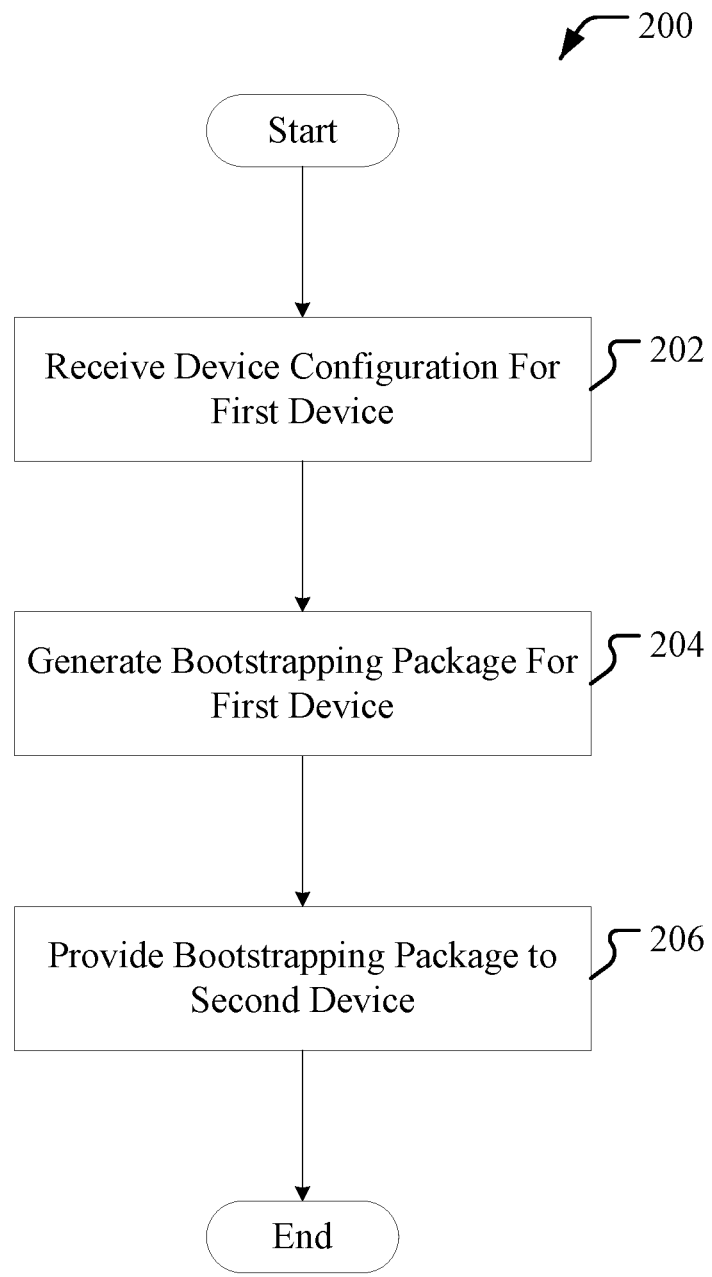
FIG. 2 illustrates an example method for disaster recovery for edge devices.

FIG. 2 illustrates an example method for disaster recovery for edge devices. Example method 200 begins at operation 202, where a device configuration for a first device is received. In examples, a service environment, such as service environment 106, receives a device configuration from a first device, such as edge device(s) 105. The device configuration comprises settings and information relating to the device state and the workload configuration of the first device. In one example, the device configuration comprises metadata associated with the device configuration of the first device, but the device configuration does not comprise the underlying data being handled by the first device. For instance, the device configuration may comprise bandwidth settings for the first device, but the device configuration will not comprise the data packets transmitted by the first device in accordance the bandwidth settings.

At operation 204, a bootstrapping package is generated for the first device. In examples, a service of the service environment, such as service(s) 108, receives the multiple device configurations for the first device. The service uses the information in the device configurations to generate a bootstrapping package that enables the device configurations (e.g. the device configuration for the first device) to be self-compiled or self-installed on an edge device. In one example, the service comprises or has access to a declarative model that is used to describe the device state and workload configuration of the first device. The declarative model segments the device state and the workload configuration of the first device into separate objects and namespaces and maps the segmented objects to the respective namespaces. The information that is segmented and mapped by the declarative model ("declarative model information") is then added to a bootstrapping package. Instructions (e.g., executable instructions or commands) for automatically applying the declarative model information to one or more devices and recombining the segmented device state and the workload configuration is also added to the bootstrapping package. In an example, the instructions enable the declarative model information to be applied to devices having the same hardware and/or software configuration as the first device or a different hardware and/or software configuration from the first device.

At operation 206, the bootstrapping package is provided to a second device. In examples, the service environment receives a request for the bootstrapping package. The request may be a manual request received from the first device or received directly by the service environment (e.g., via an interface provided by the service environment). In one example, the first device automatically provides a request to the service environment based on an event detected by the first device. For instance, in response to detecting a hardware or software failure of the first device, the first device may automatically request that a disaster recovery process be initiated by the service environment. In another example, the service environment generates the request based on an event detected by the service environment. For instance, in response to detecting that a certain number or type of error messages have been logged by the first device, the service environment proactively initiates a disaster recovery process. In such examples, the service environment provides the bootstrapping package in response to the receiving the request. In some examples, the service environment puts the first device in a read-only mode in response to receiving a request for the bootstrapping package. In some examples, the service environment deactivates the first device or puts the first device in a read-only mode in response to the bootstrapping package being provided to the second device.

Figure 3:
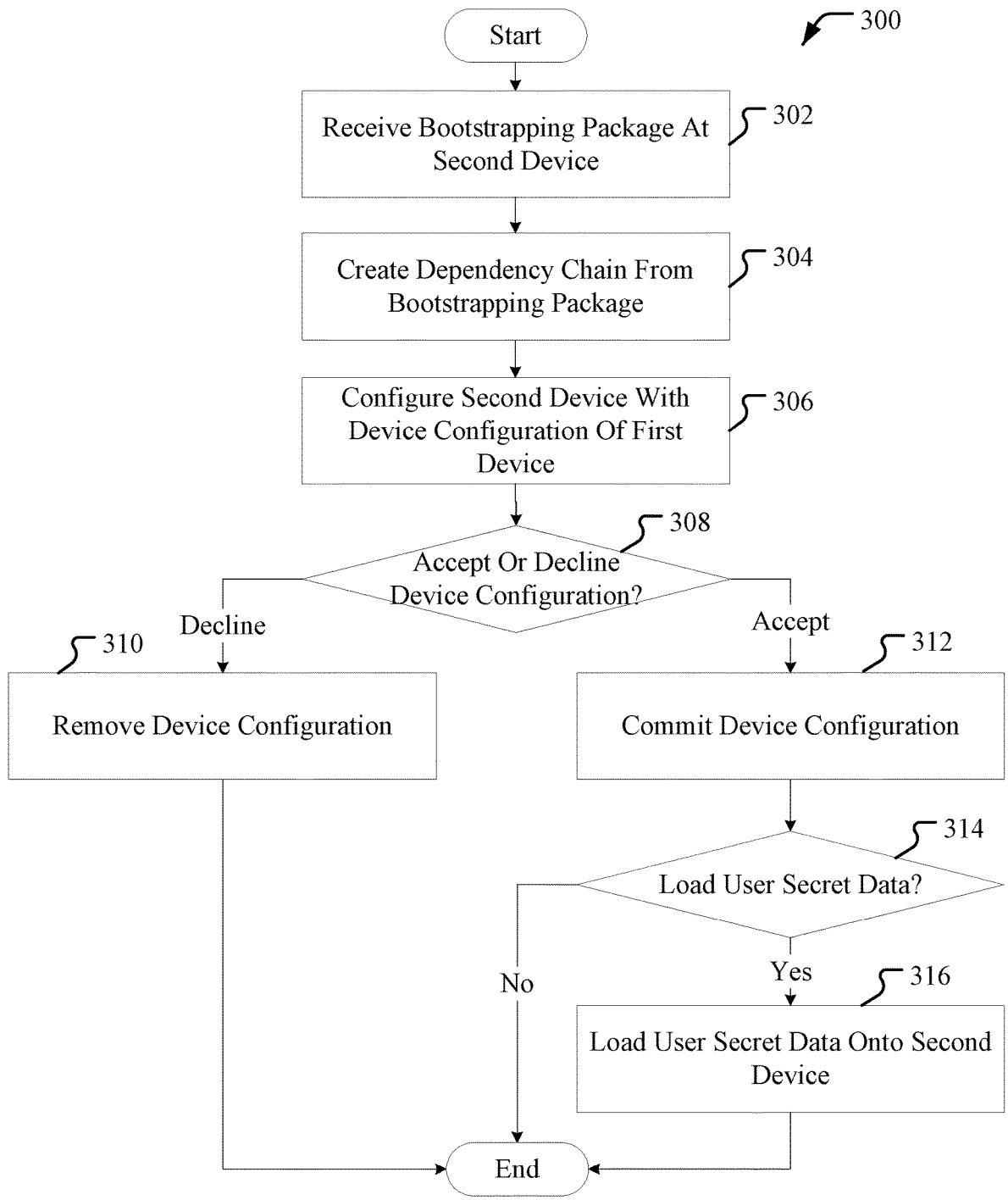
FIG. 3 illustrates an example method for the automated configuration of a replacement device.

FIG. 3 illustrates an example method for the automated configuration of a replacement device. Example method 300 begins at operation 302, where a bootstrapping package is received by a second device, such as edge device(s) 105. In examples, the second device is intended to be a replacement for a first device, which may also be an edge device(s) 105. In examples, the bootstrapping package comprises one or more device configurations of the first device and instructions for automatically configuring the second device with the device configuration of the first device. The device configuration of the first device may comprise device state and the workload configuration information (e.g., objects) that has been segmented into different namespaces. The segmented information may be organized hierarchically. For instance, a namespace that has segmented into sub-namespaces will be organized such that the namespace is higher in the hierarchy that the sub-namespaces.

At operation 304, a dependency chain is created from the bootstrapping package. In examples, the second device comprises or has access to a configuration device agent. The configuration device agent receives the bootstrapping package and uses the information in the bootstrapping package to build a topological dependency chain. The topological dependency chain associates the objects of the device state and workload namespaces (e.g., namespace signs and device configuration data) with each other and defines dependencies between the objects. For instance, topological dependency chain may indicate that a namespace depends on the sub-namespaces of the namespace.

At operation 306, the second device is configured with the device configuration of the first device. In examples, the configuration device agent evaluates the topological dependency chain to recreate the device state and the workload configuration of the first edge device. In one example, the configuration device agent begins the evaluation at the lowest level of topological dependency chain (e.g., the lowest level of the dependency hierarchy). The evaluation proceeds through higher levels of the topological dependency chain until the highest level of the topological dependency chain has been evaluated. As part of the evaluation, the objects of the topological dependency chain are reassembled into unsegmented device state and the workload configuration information. The unsegmented device state and the workload configuration information is then applied to the second device to configure the second device with the device configuration of the first device.

At decision operation 308, the second device provides an option to accept or decline the device configuration of the first device. If the option to decline the device configuration of the first device is selected, method 300 proceeds to operation 310. At operation 310, the device configuration of the first device is removed from the second device and method 300 ends. However, if the option to accept the device configuration of the first device is selected, method 300 proceeds to operation 312. At operation 312, the device configuration of the first device is committed (e.g., saved) to the second device and method 300 ends. In one example, the second device deactivates the first device or puts the first device in a read-only mode in response to (or prior to) receiving an indication that the configuration of the first device is to be committed to the second device.

At decision operation 314, the second device provides an option to load user data (e.g., user secret data) associated with the first device onto the second device. In examples, the user secret data comprises sensitive user data that is stored by the first device or used to interact with the first device. For instance, the user secret data may comprise passwords for accessing applications and services from the first device (e.g., applications and services installed on the first device or accessed remotely from the first device). In examples, the user secret data is not provided in the bootstrapping package. Instead, when (or before or after) the first device provides its device configuration to the service environment, the first device provides the user secret data to a storage location that is not accessible by the service environment. This separation of user secret data from the device configuration enables a user to clearly demarcate sensitive user data from semi-private or public user data.

If, at decision operation 314, the option to load user secret data onto the second device is declined, the user secret data is not loaded and method 300 ends. However, if the option to load user secret data onto the second device is selected, method 300 proceeds to operation 316. At operation 316, the second device loads the user secret data onto the second device. In some examples, the user provides the user secret data to the second device. In other examples, the second device requests the user secret data from the storage location that stores the user secret data. For instance, the user may provide a security credential for accessing the user secret data to the second device. The second device may then use the security credential to retrieve the user secret data. In either example, the second device loads the user secret data onto the second device and method 300 ends.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration, and, as is understood, a vast number of computing device configurations may be utilized for practicing aspects of the disclosure, described herein.

Figure 4:
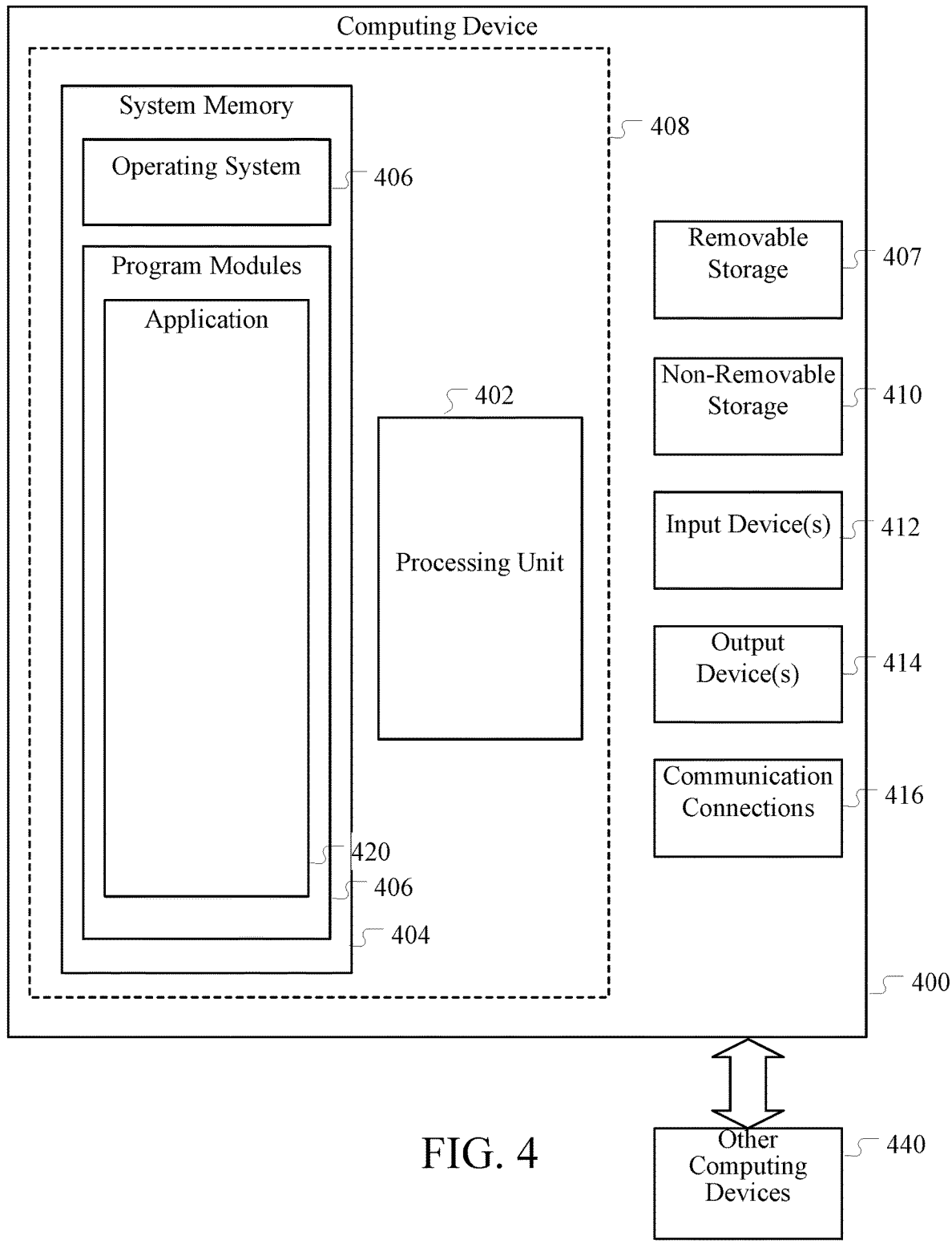
FIG. 4 is a block diagram illustrating example physical components of an input processing unit for executing one or more aspects of the present disclosure.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing unit 402 and a system memory 404. Depending on the configuration and type of computing device, the system memory 404 may comprise volatile storage (e.g., random access memory), non-volatile storage (e.g., read-only memory), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may include additional data storage devices (removable and/or non-removable) such as, for example, magnetic disks, optical disks, tape, and other computer readable media. Such additional storage is illustrated in FIG. 4 by a removable storage device 407 and a non-removable storage device 410.

The term computer readable media as used herein includes computer storage media. Computer storage media includes volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media includes random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media includes wired media such as a wired network or direct-wired connection, and wireless media such as acoustic, RF, infrared, and other wireless media.

As stated above, a number of program modules and data files may be stored in the system memory 404. While executing on the processing unit 402, the program modules 406 (e.g., application 420) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of a client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. Output device(s) 414 such as a display, speakers, a printer, etc. may also be included. The aforementioned devices are examples and others may be used. The computing device 400 may include one or more communication connections 416 allowing communications with other computing devices 440. Examples of suitable communication connections 416 include radio frequency (RF) transmitter, receiver, and/or transceiver circuitry; universal serial bus (USB), parallel, and/or serial ports.

Figure 5:
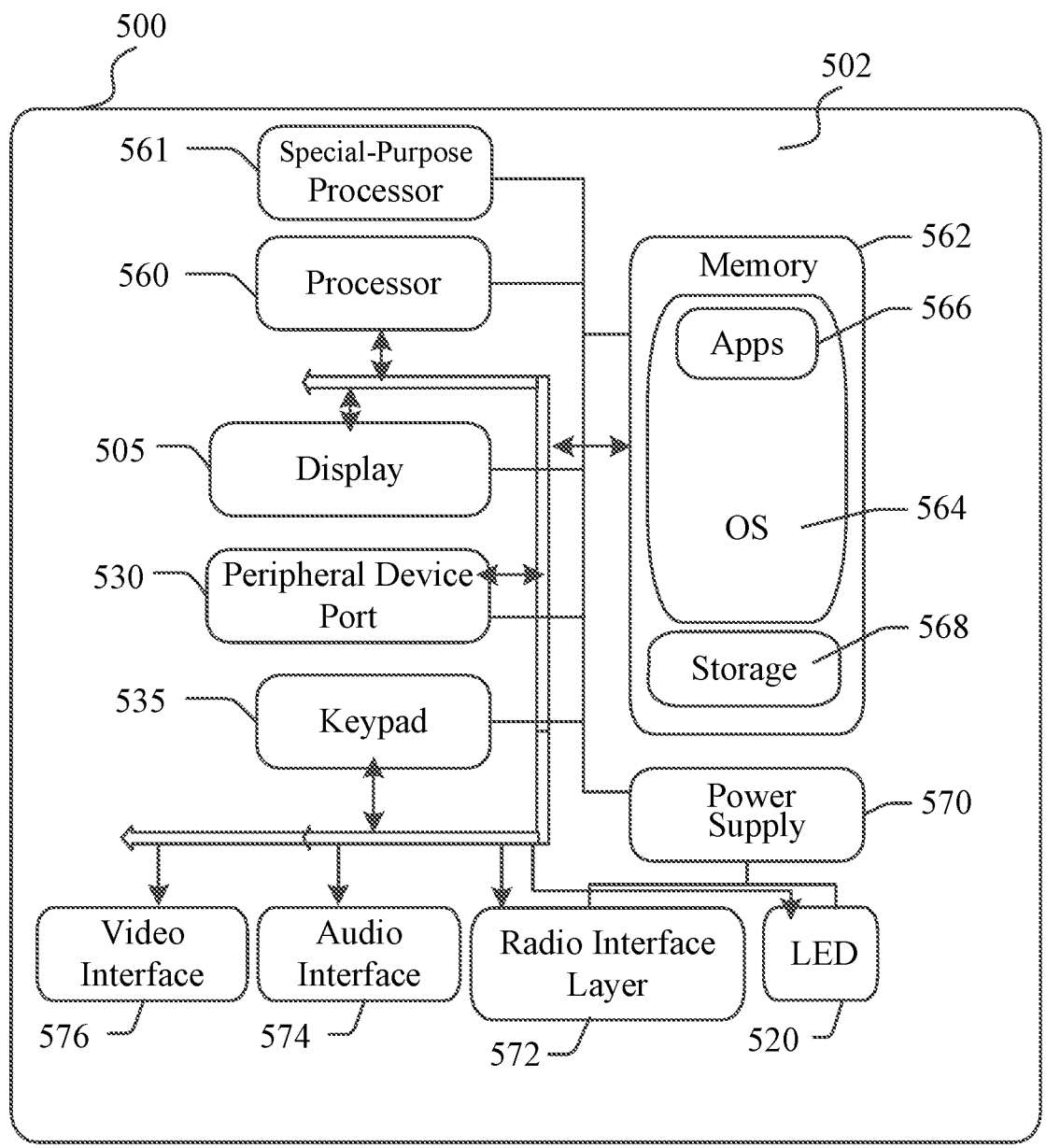
FIG. 5 is block diagram of an example edge device for practicing aspects of the present disclosure.

FIG. 5 is a block diagram illustrating the architecture of one aspect of an edge device. That is, the edge device can incorporate a system (e.g., an architecture) 502 to implement some aspects. In one embodiment, the system 502 is capable of running one or more applications (e.g., browser, e-mail, calendaring, contact managers, messaging clients, games, and media clients/players).

One or more application programs 566 may be loaded into the memory 562 and run on or in association with the operating system (OS) 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device described herein (e.g., search engine, extractor module, relevancy ranking module, answer scoring module).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the OS 564, and vice versa.

The visual indicator (e.g., light emitting diode (LED) 520) may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone also serves as an audio sensor to facilitate control of notifications, as will be described below. The system 502 may further include a video interface 576 that enables an operation of a peripheral device port 530 (e.g., an on-board camera) to record still images, video stream, and the like.

An edge device implementing the system 502 may have additional features or functionality. For example, the edge device may also include additional data storage devices (removable and/or non-removable) such as, magnetic disks, optical disks, or tape. Such additional storage is illustrated in FIG. 5 by the non-volatile storage area 568.

Data/information generated or captured by the edge device and stored via the system 502 may be stored locally on the edge device, as described above, or the data may be stored on any number of storage media that may be accessed by the edge device via the radio interface layer 572 or via a wired connection between the edge device and a separate computing device associated with the edge device. For example, the edge device may be connected to a server computer in a distributed computing network, such as the Internet. Such data/information may be accessed via the edge device, via the radio interface layer 572, or via a distributed computing network. Similarly, such data/information may be transferred between computing devices for storage and use according to data transfer and storage means, including electronic mail and collaborative data sharing systems.

Figure 6:
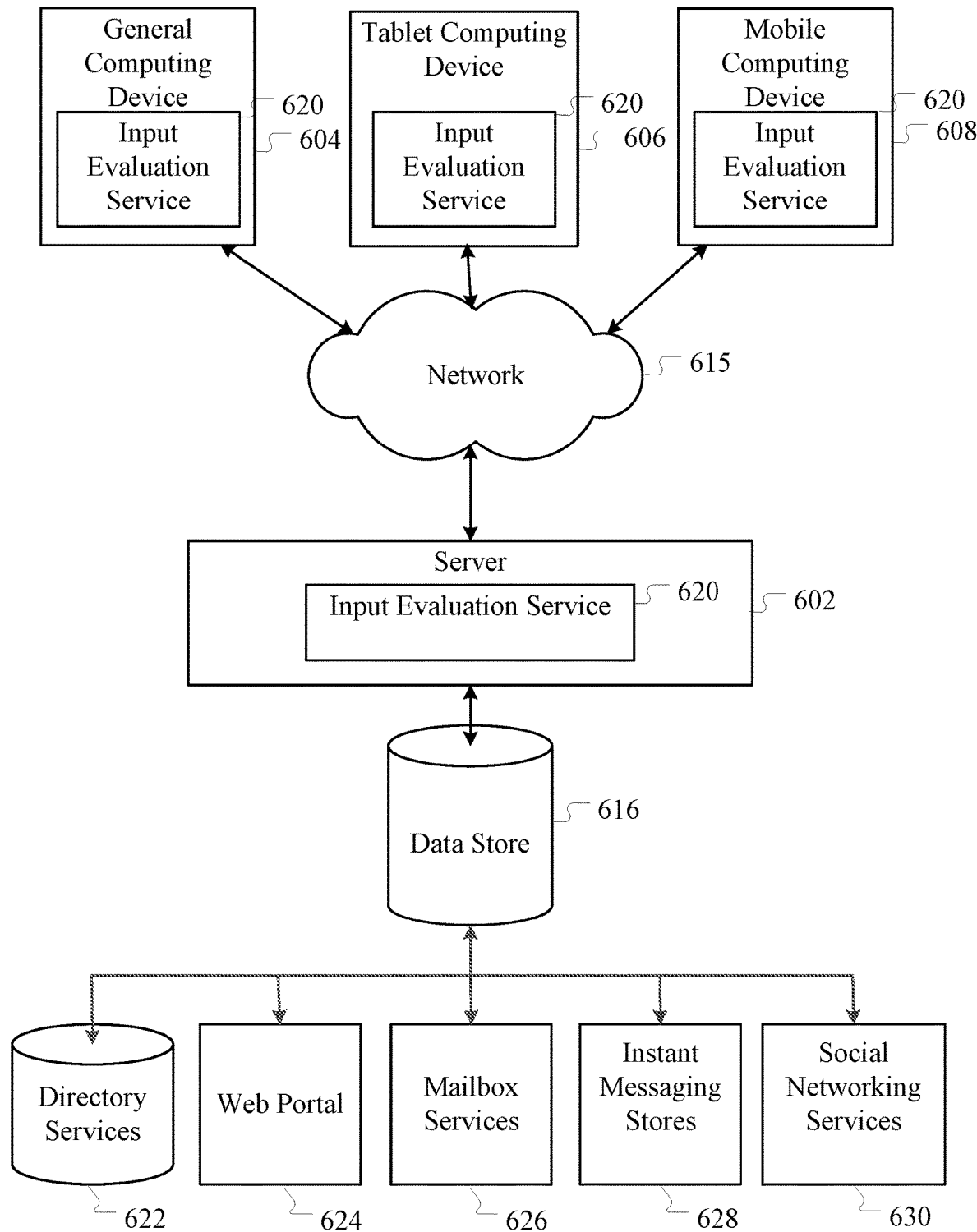
FIG. 6 is a simplified block diagram of an example distributed computing system for practicing aspects of the present disclosure.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using directory services 622, web portals 624, encryption services 626, machine learning/cognitive services 628, or image processing services 630.

An input evaluation service 620 may be employed by a client that communicates with server device 602, and/or input evaluation service 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the data store 616, in addition to receiving graphical data useable to be either pre-processed at a graphic-originating system, or post-processed at a receiving computing system.

An example implementation relates to a system. The system comprises a processor and memory coupled to the processor. The memory comprises computer executable instructions that, when executed by the processor, perform the method. A device configuration is received for a first device. The device configuration comprises a device state and a workload configuration of the first device. A bootstrapping package is generated based on the device configuration for the first device. Generating the bootstrapping package comprises segmenting the device state into a first namespace and segmenting the workload configuration into a second namespace. The bootstrapping package is provided to a second device. The bootstrapping package is configured to be self-compiled or self-installed on the second device by the second device.

Another example implementation relates to a computer-implemented method. A current device configuration for a first device is received. The current device configuration comprises a device state and a workload configuration of the first device. A bootstrapping package is generated based on the current device configuration for the first device. Generating the bootstrapping package comprises segmenting the device state and the workload configuration into a namespace. The bootstrapping package is provided to a second device. The bootstrapping package is configured to be automatically installed on the second device Another example implementation relates to a device, such as an edge device. The device comprises a processor and memory coupled to the processor. The memory comprises computer executable instructions that, when executed by the processor, perform a method. A device configuration is received for a first device. The device configuration comprises a device state and a workload configuration of the first device. In response to a request to perform disaster recovery for the first device, a bootstrapping package is generated based on the device configuration for the first device. Generating the bootstrapping package comprises segmenting at least one of the device state or the workload configuration into a set of namespaces. The bootstrapping package is provided to a second device that is a replacement for the first device. The bootstrapping package is configured to automatically install the device configuration of the first device on the second device.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, perform a method comprising:
receiving, at a service provider environment from a first edge device implemented in an edge environment, a device configuration for the first edge device, the device configuration comprising a device state and a workload configuration of the first edge device, wherein the first edge device provides an entry point for a user device implemented in a user environment to access the service provider environment, the edge environment being different from the user environment and the service provider environment, the device state comprising at least one of:
bandwidth setting for the first edge device;
data storage information for the first edge device; or
an access protocol for accessing the first edge device;
generating, by service provider environment, a bootstrapping package based on the device configuration for the first edge device, the bootstrapping package being configured to be self-installed when executed, wherein generating the bootstrapping package comprises segmenting the device state into a first namespace and segmenting the workload configuration into a second namespace; and
in response to a failure or an imminent failure of the first edge device, providing, by the service provider environment, the bootstrapping package to a second edge device that is a replacement for the first edge device, the second edge device being deployed in the edge environment, wherein the device configuration is automatically applied to the second device by executing the bootstrapping package in response to receiving the bootstrapping package.

2. The system of claim 1, wherein the device state further comprises
credential information for the first edge device.

3. The system of claim 1, wherein the workload configuration comprises at least one of:
a container object for a workload;
a device connection string; or
a task object for a workload.

4. The system of claim 1, wherein the device configuration for the first edge device is received in response to an update to the first edge device.

5. The system of claim 1, wherein generating the bootstrapping package further comprises using a declarative model to describe the device state and the workload configuration.

6. The system of claim 5, wherein using the declarative model comprises:
segmenting, by the declarative model, the device state into a first set of objects and the first namespace;
mapping the first set of objects to the first namespace;
segmenting, by the declarative model, the workload configuration into a second set of objects and the second namespace; and
mapping the second set of objects to the second namespace.

7. The system of claim 6, wherein the bootstrapping package comprises instructions for recombining the first set of objects and the first namespace and recombining the second set of objects and the second namespace.

8. The system of claim 1, wherein providing the bootstrapping package to the second edge device comprises:
detecting a hardware or software failure of the first edge device; and
providing the bootstrapping package to the second edge device in response to detecting the hardware or software failure of the first edge device.

9. The system of claim 1, wherein providing the bootstrapping package to the second edge device comprises:
receiving a user request to perform disaster recovery for the first edge device;
identifying the second edge device as a replacement for the first edge device; and
acquiring the second edge device.

10. The system of claim 9, wherein acquiring the second edge device comprises at least one of:
placing a purchase order for the second edge device;
assigning a currently deployed computing device for use as the second edge device; or
configuring a computing device for use as the second edge device.

11. The system of claim 1, wherein the method further comprises at least one of:
deactivating the first edge device; or
placing the first edge device into read-only mode.

12. The system of claim 1, wherein the device configuration for the first edge device comprises metadata for the device state and does not comprise underlying data handled by the first edge device.

13. A method comprising:
receiving, at a service provider environment from a first edge device implemented in an edge environment, a current device configuration for the first edge device, the current device configuration comprising a current device state and a current workload configuration of the first edge device, wherein the first edge device provides an entry point for a user device implemented in a user environment to access a service provider environment, the edge environment being different from the user environment and the service provider environment, the device state comprising at least one of:
bandwidth setting for the first edge device;
data storage information for the first edge device; or
an access protocol for accessing the first edge device;
generating, by service provider environment, a bootstrapping package based on the current device configuration and at least one previous device configuration for the first edge device, the at least one previous device configuration comprising a previous device state and a previous workload configuration for the first edge device, wherein generating the bootstrapping package comprises segmenting the device state and the workload configuration into a namespace; and
in response to a failure or an imminent failure of the first edge device, providing, by the service provider environment, the bootstrapping package to a second edge device, wherein the at least one previous device configuration and the current device configuration are configured to be automatically and sequentially installed on the second edge device.

14. The method of claim 13, wherein the current device configuration for the first edge device is received in response to at least one of:
a hardware or software failure of the first edge device;
the expiration of period of time; or
the expiration of a license.

15. The method of claim 13, wherein the device state further comprises at least one of:
a power state of the first edge device;
a disk state of the first edge device; or
a memory state of the first edge device.

16. The method of claim 13, wherein the current device configuration for the first edge device comprises only configuration information that has been updated since the at least one previous device configuration for the first edge device was received, the at least one previous device configuration being received prior to the current device configuration.

17. The method of claim 13, wherein the bootstrapping package is a single executable file for performing disaster recovery.

18. The method of claim 13, wherein the second edge device is not located in the edge environment.

19. A computing device comprising:
a processor; and
memory coupled to the processor, the memory comprising computer executable instructions that, when executed by the processor, perform operations comprising:
receiving, at a service provider environment from a first device implemented in an edge environment, a device configuration that is specific to the first device, the device configuration comprising a device state and a workload configuration of the first device, wherein the first device enables user devices to access a service provider environment, the device state comprising at least one of:
bandwidth setting for the first device;
data storage information for the first device; or
an access protocol for accessing the first device;
in response to a request to perform disaster recovery for the first device, generating, by service provider environment, a bootstrapping package that includes the device configuration for the first device, the bootstrapping package being configured to self-install the device configuration for the first device on a second device, wherein generating the bootstrapping package comprises segmenting at least one of the device state or the workload configuration into a set of namespaces; and
providing the bootstrapping package to the second device that is a replacement for the first device and enables the user devices to access the service provider environment.

20. The system of claim 1, wherein:
the device configuration is a first device configuration; and
the bootstrapping package includes the first device configuration and a second device configuration that comprises a previous device state for the first edge device and a previous workload configuration for the first edge device.

* * * * *